United States Patent

[11] 3,600,739

| [72] | Inventor | Peter Mower<br>Whitton, Twickenham, England |
|---|---|---|
| [21] | Appl. No. | 806,454 |
| [22] | Filed | Mar. 12, 1969 |
| [45] | Patented | Aug. 24, 1971 |
| [73] | Assignee | Trico Products Corporation<br>Buffalo, N.Y. |
| [32] | Priority | Mar. 13, 1968 |
| [33] | | Great Britain |
| [31] | | 12251/68 |

[54] ARM AND BLADE ASSEMBLY
6 Claims, 4 Drawing Figs.

[52] U.S. Cl. ................................................. 15/250.23,
15/250.32
[51] Int. Cl. ................................................... A47l 1/02
[50] Field of Search ........................................ 15/250.23,
250.32, 250.33, 250.31

[56] References Cited
UNITED STATES PATENTS
2,560,780  7/1951  Sacchini ..................... 15/250.32 X

*Primary Examiner*—Robert W. Jenkins
*Attorney*—E. Herbert Liss

ABSTRACT: A wiper arm and drag link are pivoted about parallel axes on a pivot block at their blade carrying ends; at its other end the arm is mountable on a pivot shaft for oscillation therewith; the drag link is detachably anchored adjacent the pivot shaft for pivotal movement; the arm and drag link form a parallelogram linkage to oscillate the blade relative to the arm assembly as the arm assembly oscillates to and fro across a windshield; the end of the arm and an annular recess formed in an upstanding connecting pin secured to the blade provide a detachable arm to blade connection, the pin extending through the pivot block.

Patented Aug. 24, 1971
3,600,739
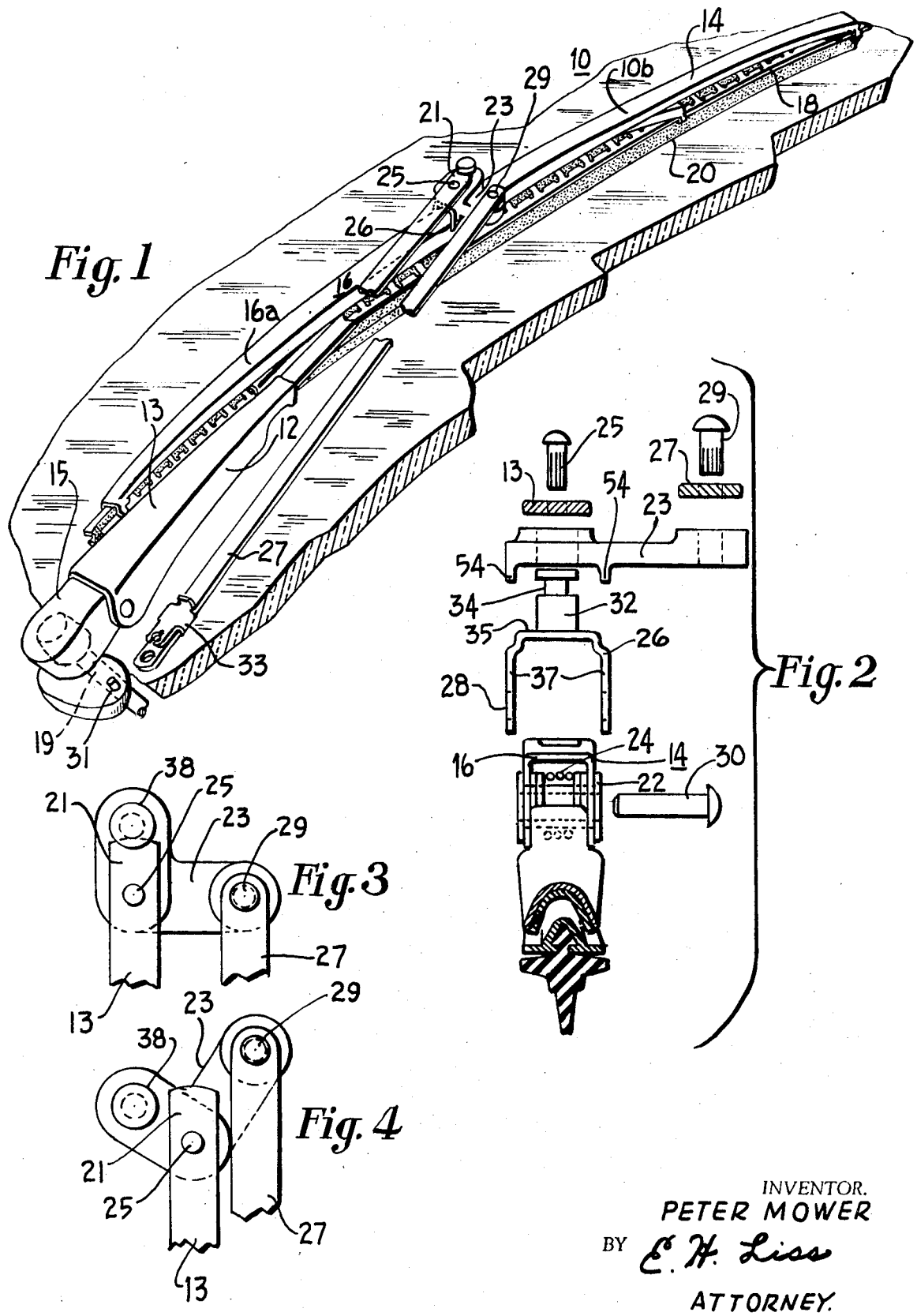
INVENTOR.
PETER MOWER
BY E. H. Liss
ATTORNEY.

ARM AND BLADE ASSEMBLY

BACKGROUND OF THE INVENTION

The invention relates to an arm and blade assembly and more particularly to an arm and blade assembly incorporating an arm of the parallelogram type with a readily detachable arm to blade connection.

An assembly of this kind is disclosed in U.S. Pat. No. 3,418,678 by Raymond A. Deibel and Anthony C. Scinta which shows an assembly in which the outer ends of the wiper arm and of the drag link are coupled together by a pivot block provided with a laterally projecting pin for supporting the blade.

For certain applications it is desirable to provide a saddle-type blade connector with the outer end of the arm overlying the blade superstructure rather than to utilize the side mounting arrangement.

SUMMARY OF THE INVENTION

A saddle member is pivotally mounted on the superstructure of the blade by means of a transverse pivot or pin carried by the superstructure. The web of the saddle is provided with a connecting pin projecting from the outer surface thereof and is receivable into a complimentary opening in the pivot block. The connecting pin extends upwardly through the pivot block and is annularly recessed adjacent its free end. The outer ends of the wiper arm and drag link are pivotally connected to the pivot block about an axis parallel to the connecting pin. The drag link may be detachably connected to its pivotal axis either at the pivot block or to a pivot pin adjacent the pivot shaft. When the wiper arm is in an operative angular position within its operating range the free outer end of the wiper arm engages the recess in the connecting pin, thereby retaining the saddle pivot block blade and arm secured together. The arm can be readily detached by unlatching the drag link at its detachable connection and rotating the pivot block to a position where the free end of the wiper arm becomes disengaged from the annular recess in the connecting pin.

The principal object of the present invention is to provide a readily releasable arm to blade connection in a parallelogram type windshield wiper arm wherein the arm is connected to the saddle-type connector on the blade.

Other object and advantages will be apparent from the following detailed description taken in connection with the accompanying drawings.

BRIEF DESCRIPTION OF THE DRAWINGS

FIG. 1 is a perspective view of the arm and blade assembly of the invention.

FIG. 2 is an exploded and elevational view, partly in section, of the arm and blade assembly.

FIG. 3 is a fragmentary top elevational view of the blade connector and arm assembly operatively connected.

FIG. 4 is a top elevational view similar to FIG. 3 showing the elements in detachable position.

DESCRIPTION OF THE PREFERRED EMBODIMENT

Referring to FIGS. 1 and 2 there is shown a windshield wiper arm and blade assembly 10 comprising a wiper arm assembly 12 and a wiper blade assembly 14. The wiper arm assembly 12 comprises a wiper arm 13 having a mounting head 15 pivotally secured thereto about a transverse axis 17 securing the arm to a pivot shaft 19 for oscillation therewith. Adjacent its outer end 21 the arm 13 is pivotally secured to a pivot block 23 on a stub shaft 25. A drag link 27 is pivotally secured at its outer end to the pivot block 23 on a stub shaft 29. At its inner end the drag link 27 is pivotally and detachably secured to a pivot pin 31 located adjacent the pivot shaft 19. The detachable connection may be effected by any suitable or desirable means as for example a slidable latch 33, as shown. In accordance with the broadest aspect of the invention a detachable connection for the drag link 27 may be made either end or both ends if desired.

The wiper blade assembly comprises a superstructure 16 having a plurality of levers and yokes connected to a flexible backing strip 18 which retains a wiper squeegee element 20. The superstructure 16 may include a pair of outer levers 16a and 16b, channel shaped in cross section, pivotally secured together at their adjacent ends by a hollow tubular rivet member 22 extending transversely through aligned openings in the legs of the channel section of the levers 16a and 16b. The rivet member 22 also forms a guide or core for a spring hinge 24.

A saddle member 26 comprising a web 35 and legs 37 may be pivotally secured to the superstructure 16 at the junction of the outer lever members 16a and 16b by a pin or rivet 30 extending through the hollow rivet member 22 and aligned openings 38 in the legs 37 of the saddle member 26. A connecting pin 32 projects from the outer surface of web 35 of saddle 26. The connecting pin 32 is formed with an annular groove or recess 34 at its upper end forming a pair of opposing shoulders for a purpose to be explained hereinafter.

The pivot block 23, best illustrated in FIGS. 3 and 4, is L-shaped but in accordance with the broader aspects of the invention may take other suitable or desirable forms. A cylindrical bore 38 at the end of one leg of the pivot block 23 is provided to receive the connecting pin 32 on the saddle member 26. The connecting pin 32 is longer than the bore 38 so that when the pin 32 is inserted into the bore from the windshield side of the pivot block 23 it projects beyond the outer end of the bore 38. Thus the groove 34 is exposed and is located in a position to receive therein a suitable latching device that will retain the connecting pin 32 in the bore 38 in a readily releasable manner thereby maintaining the arm and blade in assembled condition. Preferably the windshield side of the pivot block 36 is formed with spaced parallel ribs 54 thereon which serve to locate the saddle member 26 in its correct angular position in relation to the pivot block 23 and to prevent relative angular movement between the saddle member 26 and the pivot block 23. The outer end 21 of the wiper arm 13 is arranged to form the latch that holds the connecting pin 32 in the bore 38 of the pivot block 23. In FIG. 3 one limb of the L-shaped block 23 is shown disposed substantially in alignment with the arm 13. In this position of the pivot block 23, the outer end 21 of the arm 13 is arranged to overhang the bore 38 in the block 23 by a distance that is slightly less than the depth of the groove 34 in the connecting pin 32. The shortest distance between the wall of the bore 38 and the axis of the stub shaft 25 in the arm 13 is arranged to be greater than half the width of the arm 13 in the vicinity of the shaft 25. Thus if the pivot block 23 is rotated counterclockwise from the position in which it is shown in FIG. 3 to the position shown in FIG. 4 the bore 38 in the pivot block 23 will be moved progressively away from under the arm 13 to a leading position at the side of the arm 13 in which position a blade carrying the saddle member 26 can be mounted on the pivot block 23 by inserting the pin 32 thereof into the bore 38 from the windshield side of the block until the web of the saddle member 26 butts against the pivot block 23. The saddle member 26 is then held in this position while the pivot block 23 is moved clockwise to a position such that when the end 21 of the arm 13 has entered the groove 34 in connecting pin 32 it prevents removal of the pin 32.

Spring means (not shown) may be provided between the arm 13 and the mounting head 15 for urging the blade 14 carried by the arm assembly 12 into engagement with the windshield. The inner end of the drag link 27 will be anchored on a pin 31 for rotation about an axis parallel to the axis of the pivot shaft so that it can follow the movement of the arm 13 and with the arm 13 can cause angular movement of the pivot block 23 relative to the arm 13 about the shaft 25 and angular movement of the wiper blade assembly 14 relative to the arm 13 as the arm assembly moves the blade to and fro across a vehicle windshield. When the arm assembly 12, comprising arm 13 and drag link 27, are mounted respectively on pivot shaft 19 and pin 31 in operative association with the windshield, the blade and arm assembly 10 can be displaced angularly to fro for across the windshield only between a limited range of operative angular positions. Thus the pivot block 23 cannot be rotated to a position such as the position shown in FIG. 4 where the end 21 of the arm 13 moves out of the groove 34 in the pin 32. In order to enable the blade to be released from the block 23 it is necessary either to disconnect the outer end of the drag link from the block 23 or to disconnect its inner end from the shaft or pin 31 on which the drag link rotates. The pivot block 23 can then be moved to an inoperative angular position relative to the arm 13 as shown in FIG. 4. Then the blade can be removed or a new blade can be mounted on the pivot block 23 and secured in the manner described hereinabove.

A certain specific embodiment of the invention has been described for the purpose of illustration but it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. In a windshield wiper arm and blade assembly including a windshield wiper blade comprising a superstructure and connector means mounted thereon for securing a wiper arm thereto, said connector means including a connector pin having an annular shoulder, a wiper arm, a pivot block, said wiper arm being pivotally connected to said pivot block adjacent its free end on an axis spaced from and separate from said connector pin, an opening through said pivot block for receiving said connector pin, said opening being spaced from said axis, the free end of said arm being engageable with said shoulder to retain said blade operatively connected to said arm when said connector pin is received in said opening and when said wiper blade is positioned in an operative angular position relative to said wiper arm and means for retaining said wiper arm in said operative angular position when said blade and arm combination is mounted for operation on a windshield.

2. A windshield wiper arm and blade assembly according to claim 1, wherein said connector means comprises a saddle pivotally connected to said superstructure about a transverse axis.

3. A windshield wiper arm and blade assembly according to claim 1 wherein said means for retaining said wiper arm in operative angular position comprises a drag link pivotally secured at one end to said pivot block about an axis parallel to the pivotal axis connecting said arm and pivot blade.

4. A windshield wiper arm and blade assembly according to claim 1 wherein said end of said arm remote from said pivot block comprises a mounting head for securing the arm to a pivot shaft.

5. A windshield wiper arm and blade combination according to claim 3 wherein said drag link includes detachable latching means at one end thereof.

6. A windshield wiper arm and blade assembly according to claim 3 inclusive, wherein said drag link includes detachable latching means for pivotally anchoring said drag link about an axis parallel to the axis of an adjacent pivot shaft at its end remote from said pivot block.